United States Patent
Anokhin et al.

(10) Patent No.: US 11,823,349 B2
(45) Date of Patent: Nov. 21, 2023

(54) IMAGE GENERATORS WITH CONDITIONALLY-INDEPENDENT PIXEL SYNTHESIS

(71) Applicant: Samsung Electronics Co., Ltd., Suwon-si (KR)

(72) Inventors: Ivan Aleksandrovich Anokhin, Moscow (RU); Kirill Vladislavovich Demochkin, Moscow (RU); Taras Andreevich Khakhulin, Moscow (RU); Gleb Mikhailovich Sterkin, Moscow (RU); Victor Sergeevich Lempitsky, Moscow (RU); Denis Mikhailovich Korzhenkov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 17/697,436

(22) Filed: Mar. 17, 2022

(65) Prior Publication Data
US 2022/0207646 A1    Jun. 30, 2022

Related U.S. Application Data

(63) Continuation of application No. PCT/KR2021/008163, filed on Jun. 29, 2021.

(30) Foreign Application Priority Data

Nov. 19, 2020 (RU) .......................... RU2020138009
Mar. 4, 2021 (RU) .......................... RU2021105620

(51) Int. Cl.
*G06T 3/40* (2006.01)
*G06N 3/04* (2023.01)
(Continued)

(52) U.S. Cl.
CPC ............. *G06T 3/4038* (2013.01); *G06N 3/04* (2013.01); *G06N 3/045* (2023.01); *G06N 3/047* (2023.01);
(Continued)

(58) Field of Classification Search
CPC ......... G06T 3/4038; G06T 11/60; G06N 3/04; G06N 3/045; G06N 3/047; G06N 3/048; G06N 3/08
See application file for complete search history.

(56) References Cited

U.S. PATENT DOCUMENTS 7,589,729 B2   9/2009   Skibak et al.
9,953,246 B2   4/2018   Bouchard et al.
(Continued)

FOREIGN PATENT DOCUMENTS

CN    106683048 A    5/2017
RU    2726160 C1    7/2020
(Continued)

OTHER PUBLICATIONS

A. Brock, J. Donahue, and K. Simonyan. "Large scale GAN training for high fidelity natural image synthesis." International Conference on Learning Representations, Feb. 25, 2019.
(Continued)

*Primary Examiner* — YuJang Tswei
(74) *Attorney, Agent, or Firm* — Jefferson IP Law, LLP

(57) ABSTRACT

The disclosure relates to multi-layer perceptron architecture, that may be used for image generation. A new architecture for image generators, where the color value at each pixel is computed independently given the value of a random latent vector and the coordinate of that pixel is provided. No spatial convolutions or similar operations that propagate information across pixels are involved during the synthesis.

6 Claims, 14 Drawing Sheets

(51) Int. Cl.
G06N 3/08 (2023.01)
G06T 11/60 (2006.01)
G06N 3/048 (2023.01)
G06N 3/045 (2023.01)
G06N 3/047 (2023.01)

(52) U.S. Cl.
CPC ............... *G06N 3/048* (2023.01); *G06N 3/08* (2013.01); *G06T 11/60* (2013.01)

(56) References Cited

U.S. PATENT DOCUMENTS

| | | |
|---|---|---|
| 10,824,909 B2 | 11/2020 | Ros Sanchez et al. |
| 10,825,219 B2 | 11/2020 | Fu et al. |
| 10,839,259 B2 | 11/2020 | Shazeer et al. |
| 2009/0153576 A1 | 6/2009 | Keller |
| 2020/0151559 A1 | 5/2020 | Karras et al. |

FOREIGN PATENT DOCUMENTS

| | | |
|---|---|---|
| WO | 2019/209820 A1 | 10/2019 |
| WO | 2020/102812 A1 | 5/2020 |

OTHER PUBLICATIONS

T. S. Cohen, M. Geiger, J. Köhler, and M.Welling. "Spherical CNNs". International Conference on Learning Representations, Feb. 25, 2018.
L. Dinh, J. Sohl-Dickstein, and S. Bengio. "Density estimation using real NVP." arXiv preprint arXiv:1605.08803, ICLR Feb. 27, 2017.
R. Durall, M. Keuper, and J. Keuper. "Watch Your Up-Convolution: CNN Based Generative Deep Neural Networks are Failing to Reproduce Spectral Distributions." In Proc. CVPR, pp. 7887-7896, Mar. 3, 2020.
D. Ha. "Generating large images from latent vectors." blog.otoro.net, Apr. 1, 2016.
D. Ha. "Generating large images from latent vectors—part two." blog.otoro.net, Jun. 2, 2016.
M. Heusel, H. Ramsauer, T. Unterthiner, B. Nessler, and S. Hochreiter. "GANs trained by a two time-scale update rule converge to a local Nash equilibrium." In Proc. NIPS, NIPS'17, p. 6629-6640, Red Hook, NY, USA, 2017. Curran Associates Inc. Jan. 12, 2018.
A. Karpathy. "ConvnetJS demo: Image 'painting'." https://cs.stanford.edu/people/karpathy/convnetjs/demoimage_regression.html. Accessed: Nov. 5, 2020.
T. Karras, S. Laine, and T. Aila. "A style-based generator architecture for generative adversarial networks." In Proc. CVPR, pp. 4396-4405, Mar. 29, 2019.
T. Karras, S. Laine, M. Aittala, J. Hellsten, J. Lehtinen, and T. Aila. "Analyzing and improving the image quality of StyleGAN." In Proc. CVPR, pp. 8107-8116, Mar. 23, 2020.
D. P. Kingma and J. Ba. "Adam: A method for stochastic optimization." International Conference on Learning Representations, ICLR, 2015.
D. P. Kingma and P. Dhariwal. "Glow: Generative flow with invertible 1×1 convolutions." Proc. NeurIPS, pp. 10215-10224, Jul. 10, 2018.
D. P. Kingma and M. Welling. "Auto-encoding variational Bayes." arXiv preprint arXiv:1312.6114, May 1, 2014.

T. Kynkäänniemi, T. Karras, S. Laine, J. Lehtinen, and T. Aila. "Improved precision and recall metric for assessing generative models." Proc. NeurIPS, vol. 32, pp. 3927-3936. Curran Associates, Inc., Oct. 30, 2019.
C. Lanczos. "An iteration method for the solution of the eigenvalue problem of linear differential and integral operators." Journal of Research of the National Bureau of Standards, vol. 45, No. 4. Oct. 1950.
C. H. Lin, C. Chang, Y. Chen, D. Juan, W.Wei, and H. Chen. "COCO-GAN: Generation by parts via conditional coordinating." Proc. ICCV, pp. 4511-4520, Jan. 5, 2020.
R. Liu, J. Lehman, P. Molino, F. Petroski Such, E. Frank, A. Sergeev, and J. Yosinski. "An intriguing failing of convolutional neural networks and the CoordConv solution." Proc. NeurIPS, pp. 9627-9638. Curran Associates, Inc., Dec. 3, 2018.
L. Mescheder, A. Geiger, and S. Nowozin. "Which Training Methods for GANs do actually Converge?" Proc. ICML, vol. 80 of Proceedings of Machine Learning Research, pp. 3481-3490, Stockholmsmassan, Stockholm Sweden, Jul. 31, 2018. PMLR.
B. Mildenhall, P. P. Srinivasan, M. Tancik, J. T. Barron, R. Ramamoorthi, and R. Ng. "NeRF: Representing Scenes as Neural Radiance Fields for View Synthesis." Proc. ECCV, pp. 405-421, Cham, Aug. 3, 2020. Springer International Publishing.
A. Mordvintsev, N. Pezzotti, L. Schubert, and C. Olah. "Differentiable image parameterizations." Distill, Jul. 25, 2018. https://distill.pub/2018/differentiable-parameterizations.
A. Radford, L. Metz, and S. Chintala. "Unsupervised representation learning with deep convolutional generative adversarial networks." International Conference on Learning Representations, Jan. 7, 2016.
M. S. M. Sajjadi, O. Bachem, M. Lucic, O. Bousquet, and S. Gelly. "Assessing generative models via precision and recall." Proc. NIPS, vol. 31, pp. 5228-5237. Curran Associates, Inc., Oct. 28, 2018.
K. Schwarz, Y. Liao, M. Niemeyer, and A. Geiger. "GRAF: Generative Radiance Fields for 3D-Aware Image Synthesis." NeurIPS. Curran Associates, Inc., Jul. 5, 2020.
V. Sitzmann, J. N. P. Martel, A. W. Bergman, D. B. Lindell, and G. Wetzstein. "Implicit Neural Representations with Periodic Activation Functions." Proc. NeurIPS. Curran Associates, Inc., Jun. 17, 2020.
V. Sitzmann, M. Zollhöfer, and G. Wetzstein. "Scene representation networks: Continuous 3D-structure-aware neural scene representations." Proc. NeurIPS. 2019.
K. O. Stanley. "Compositional pattern producing networks: A novel abstraction of development." Genetic Programming and Evolvable Machines, 8(2):131-162, Jun. 2007.
M. Tancik, P. P. Srinivasan, B. Mildenhall, S. Fridovich-Keil, N. Raghavan, U. Singhal, R. Ramamoorthi, J. T. Barron, and R. Ng. "Fourier Features Let Networks Learn High Frequency Functions in Low Dimensional Domains." Proc. NeurIPS. Curran Associates, Inc., Jun. 18, 2020.
A. van den Oord, N. Kalchbrenner, and K. Kavukcuoglu. "Pixel recurrent neural networks." Proc. ICML, pp. 1747-1756, Aug. 19, 2016.
F. Yu, A. Seff, Y. Zhang, S. Song, T. Funkhouser, and J. Xiao. "LSUN: Construction of a Large-scale Image Dataset using Deep Learning with Humans in the Loop." Jun. 4, 2016.
H. Zhang, I. J. Goodfellow, D. N. Metaxas, and A. Odena. "Self-attention generative adversarial networks." Proc. ICML, 2019.
Russian Office Action dated Sep. 30, 2021, issued in Russian Application No. 2021105620.
Decision on Grant dated Feb. 8, 2022, issued in Russian Application No. 2021105620.
International Search Report dated and written opinion dated Oct. 20, 2021, issued in International Patent Application No. PCT/KR2021/008163.

FIG. 12A
FIG. 12B
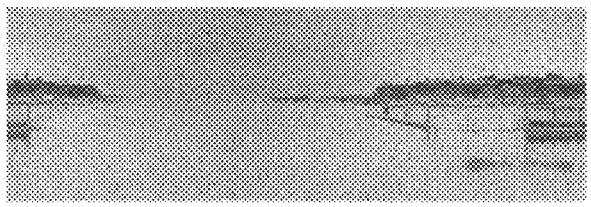
FIG. 12C
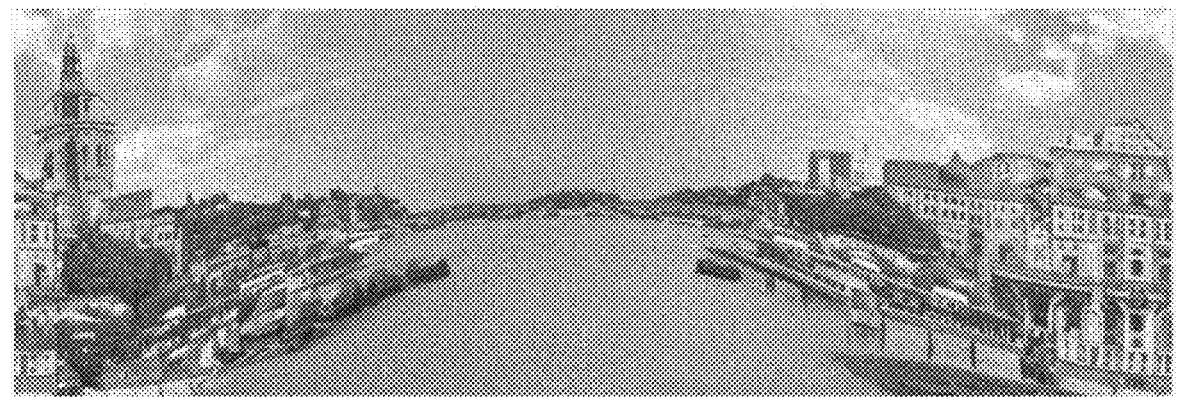

IMAGE GENERATORS WITH CONDITIONALLY-INDEPENDENT PIXEL SYNTHESIS

CROSS-REFERENCE TO RELATED APPLICATION(S)

This application is a continuation application, claiming priority under § 365(c), of an International application No. PCT/KR2021/008163, filed on Jun. 29, 2021, which is based on and claims the benefit of a Russian patent application number 2020138009, filed on Nov. 19, 2020, in the Russian Patent Office, and of a Russian patent application number 2021105620, filed on Mar. 4, 2021, in the Russian Patent Office, the disclosure of which is incorporated by reference herein in its entirety.

BACKGROUND

1. Field

The disclosure relates to multi-layer perceptron architecture, which may be used for image generation.

2. Description of Related Art

State-of-the-art in unconditional image generation is achieved using large-scale convolutional generators trained in an adversarial fashion. While various nuances and ideas have contributed to the state-of-the-art recently, for many years since the introduction of deep convolutional generative adversarial network (DCGAN) such generators are based around spatial convolutional layers, also occasionally using the spatial self attention blocks. Spatial convolutions are also invariably present in other popular generative architectures for images, including autoencoders, autoregressive generators, or flow models. Thus, it may seem that spatial convolutions (or at least spatial self-attention) is an unavoidable building block for state-of-the-art image generators.

Feeding pixel coordinates as an additional input to a neural network previously was successfully used in the widely known CoordConv technique to introduce the spatial-relational bias. Recently, the same idea was employed by the conditional coordinate generative adversarial network (COCO-GAN) to generate images by parts or create "looped" images like spherical panoramas. However, those models still use standard convolutions as a main synthesis operation. The synthesis process for neighboring pixels in such architectures is therefore not independent.

The problem of regressing a given image from pixel coordinates with a perceptron (that calculates each pixel's value independently) is understood to have started from creating compositional patterns with an evolutionary approach. Those patterns, appealing for digital artists, were also treated as kind of differentiable image parametrization. However, this approach was not capable of producing photorealistic hi-res outputs.

Some machine learning blogs reported experiments with generative adversarial networks (GANs), where the generator was a perceptron that took a random vector and pixel coordinates as an input, and returned that pixel's value as an output. The described model was successfully trained on the modified National Institute of Standards and Technology (MNIST) database, but has not been scaled to more complex image data.

Scene-representation networks and later the neural radiance fields (NeRF) networks have demonstrated how three-dimensional (3D) content of individual scenes can be encoded with surprising accuracy using deep perceptron networks. Following this realization, systems considered the usage of periodic activation functions and so-called "Fourier features" to encode the pixel (or voxel) coordinates, fed to the multi-layer perceptron. In particular, the ability to encode high-resolution individual images in this way has been demonstrated. These works, however, have not considered the task of learning image generators, addressed herein.

A recent (and independent) Generative Radiance Fields (GRAF) system showed promising results at embedding the NeRF generator into an image generator for 3D aware image synthesis. Results for such 3D aware synthesis (still limited in diversity and resolution) have been demonstrated. Herein, 3D-aware synthesis is not considered, and instead investigate whether perceptron-based architectures can achieve high two-dimensional (2D) image synthesis quality.

The above information is presented as background information only to assist with an understanding of the disclosure. No determination has been made, and no assertion is made, as to whether any of the above might be applicable as prior art with regard to the disclosure.

SUMMARY

Recently, is has been shown that individual images or collections of images of a same scene can be encoded/synthesized using rather different deep architectures (deep multi-layer perceptrons) of a special kind. Such architectures are not using spatial convolutions or spatial self-attention and yet are able to reproduce images rather well. They are, however, restricted to individual scenes. Investigated herein is whether deep generators for unconditional image class synthesis can be built using similar architectural ideas, and, more importantly, whether the quality of such generators can be state-of-the-art.

The answer (FIG. 1) is positive, at least for medium image resolution (e.g., 256×256). FIG. 1 illustrates samples from generators trained on several challenging datasets (e.g., LSUN Churches, Flickr Faces-HQ (FFHQ), Landscapes, Satellite-Buildings, and Satellite-Landscapes) at resolution 256×256 according to the related art. The images are generated without spatial convolutions, upsampling, or self-attention operations. No interaction between pixels takes place during inference.

FIG. 1 shows samples, produced by an embodiment, trained on four different datasets. Left first two columns of images have been produced by the model, trained on LSUN Churches dataset, next two columns of images have been produced by the model, trained on the FFHQ dataset, next two columns of images have been produced by the model, trained on the dataset of landscape images, and the next two last columns of images have been produced by the model, trained on the dataset of satellite images. FIG. 1 shows that the same architecture and training procedure can be applied to very different datasets and produce good results according to the related art.

Aspects of the disclosure are to address at least the above-mentioned problems and/or disadvantages and to provide at least the advantages described below. Accordingly, an aspect of the disclosure is to provide designed and trained deep generative architectures for diverse classes of images that achieve similar quality of generation to state-of-the-art convolutional generator StyleGANv2, even surpassing this quality for some datasets. Crucially, proposed generators are not using any form of spatial convolutions or spatial attention in their pathway. Instead, they use coordinate encodings of individual pixels, as well as sidewise multiplicative conditioning (weight modulation) on random vectors. Aside from such conditioning, the color of each pixel in proposed architecture is predicted independently, therefore proposed image generator architecture is called Conditionally-Independent Pixel Synthesis (CIPS) generators).

In addition to suggesting this class of image generators and comparing its quality with state-of-the-art convolutional generators, also investigated is the extra flexibility that is permitted by the independent processing of pixels. This includes easy extension of synthesis to nontrivial topologies (e.g., cylindrical panoramas), for which the extension of spatial convolutions is known to be nontrivial. Furthermore, the fact that pixels are synthesized independently within proposed generators, allows sequential synthesis for memory-constrained computing architectures. It enables the proposed model to both improve the quality of photos and generate more pixel values in a specific area of an image (i.e., to perform foveated synthesis).

Another aspect of the disclosure is to provide a novel style-based multi-layer perceptron architecture, that may be used for image generation and provides quality, comparable with modern GANs in terms of common metrics at the resolution up to 256×256.

This model, while being highly parallelizable, can also be trained to generate images by parts at training time and, therefore, is useful for practitioners with limited graphics processing unit (GPU) reproducers.

This generator is evaluated on different datasets and excels in domains without explicit spatial orientation (e.g., satellite imagery).

Existing image generator networks rely heavily on spatial convolutions and, optionally, self-attention blocks in order to gradually synthesize images in a coarse-to-fine manner.

Another aspect of the disclosure is to provide a new architecture for image generators, where a color value at each pixel is computed independently given the value of a random latent vector and the coordinate of that pixel. No spatial convolutions or similar operations that propagate information across pixels are involved during the synthesis. Modeling capabilities of such generators when trained in an adversarial fashion are analyzed, and the new generators are observed to achieve similar generation quality to state-of-the-art convolutional generators.

Another aspect of the disclosure is to provide a hardware configured to perform a method for generating images of a fixed resolution H×W with conditionally-independent pixel synthesis, the method comprising:

taking, by a multi-layer perceptron G, a random vector $z \in Z$ and float pixel coordinates $(x, y) \in \{0 \ldots W-1\} \times \{0 \ldots H-1\}$ as input;

processing the float pixel coordinates with a set of syntheses with different frequencies in order to get coordinate coding, acceptable by a network, using the float pixel coordinates to lookup for pretrained coordinate embedding in network weights;

transforming the random vector with a mapping network, where the output of this mapping network affects the weights in a fully-connected layer (ModFC);

returning, by multi-layer perceptron, a red/green/blue (RGB) value of each pixel;

evaluating the generator of perceptron G(x;y;z) at each pair(x,y) of a coordinate grid while keeping the random part z fixed; and computing the whole output image according to evaluating:

$$I = \{G(x,y;z) | (x,y) \in \text{mgrid}(H,W)\},$$

where $$\text{mgrid}(H,W) = \{(x,y) | 0 \leq x < W, 0 \leq y < H\} \quad (1)$$

is a set of integer pixel coordinates.

A mapping network and perceptron turns z into a style vector and all stochasticity in the generating process comes from this style component. Further, generated images can be images of an arbitrary resolution. Generated images can be environment maps or cylindrical panoramas. Float pixel coordinates can be cylindric coordinates to synthesize rectangular images. The float pixel coordinates are sampling an irregular grid of coordinates, denser in an area where a gaze is directed to, and sparser outside of that area.

Information about the exact location of the element can be represented in a number of ways, and some are more neural network. One way is to use absolute pixel coordinates (e.g., (243, 432)); another is to scale coordinates so that they would be in the interval of (−1, 1). A more neural network friendly way is to use «positional encoding» that was first introduced for natural language processing tasks. The idea of applying such an encoding to a broader domain has been developed.

The present disclosure may be implemented through an artificial intelligence (AI) model. A function associated with AI may be performed through the non-volatile memory, the volatile memory, and the processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Additional aspects will be set forth in part in the description which follows and, in part, will be apparent from the description, or may be learned by practice of the presented embodiments.

In accordance with an aspect of the disclosure, a method is provided. The method for generate images with conditionally-independent pixel synthesis processor includes a pre-processing operation on the data to convert into a form appropriate for use as an input for the artificial intelligence model. The artificial intelligence model may be obtained by training. Here, "obtained by training" means that a pre-defined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

Reasoning prediction is a technique of logically reasoning and predicting by determining information and includes, e.g., knowledge-based reasoning, optimization prediction, preference-based planning, or recommendation.

The disclosure was devised for resolving the aforementioned problem, and the purpose of the disclosure is in providing a cloud server that stores security data corresponding to identification information of a user so that a plurality of security modules can share the security data, and stores data transmitted from an external device, and a method for controlling thereof.

A cloud server including a plurality of security modules according to an embodiment of the disclosure may include a communicator including a circuit, a storage device that can be accessed by the plurality of security modules, and at least one processor configured to, based on receiving a request signal of preparation for data transmission and identification information of a user of an external device from the external device through the communicator, acquire security data corresponding to the identification information through one security module among the plurality of security modules, and control the communicator to transmit the security data to the external device, store the acquired security data in the storage device so that the plurality of security modules can share the security data, and based on receiving data to be stored in the cloud server and security data from the external device through the communicator, authenticate the user of the external device based on the received security data and the security data stored in the storage device by using at least one security module among the plurality of security modules, and store the data to be stored in the cloud server in the storage device.

In accordance with another aspect of the disclosure, a method for controlling a cloud server which includes a plurality of security modules, and a storage device that can be accessed by the plurality of security modules is provided. The method includes the operations of, based on receiving a request signal of preparation for data transmission and identification information of a user of an external device from the external device, acquiring security data corresponding to the identification information through one security module among the plurality of security modules, and transmitting the security data to the external device, storing the acquired security data in the storage device so that the plurality of security modules can share the security data, and based on receiving data to be stored in the cloud server and security data from the external device, authenticating the user of the external device based on the received security data and the security data stored in the storage device by using at least one security module among the plurality of security modules, and storing the data to be stored in the cloud server in the storage device.

Through the aforementioned various embodiments of the disclosure, a cloud server controls a plurality of security modules to share security data corresponding to identification information of a user who is going to transmit data, and accordingly, management of security data among security modules can be unified.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A, 12B, and 12C are images illustrating panorama blending according to various embodiments of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure is applicable in the image processing area and might be used for:

creating a model that can generate images of an arbitrary resolution, or creating a model that can synthesize non-rectangle entities like environment maps or cylindrical panoramas.

The present disclosure might be used in various image processing scenarios, and use-cases might include (but not limited to):

Image editing software;

Background synthesis for mobile phone or television (TV); or

Environment maps synthesis for computer graphics and virtual reality (VR).

The present disclosure can create natural looking images from the desired domain with variable resolution, e.g., a single model can produce a 16×16 pixel image as well as 4096×4096 pixels without model retraining.

Figure 2:
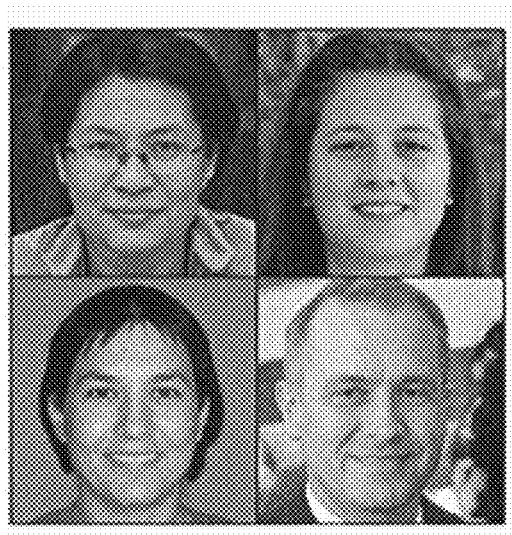
FIG. 2 illustrates random samples from a Conditionally-Independent Pixel Synthesis (CIPS) generator, trained on FFHQ dataset according to an embodiment of the disclosure.
Figure 2:
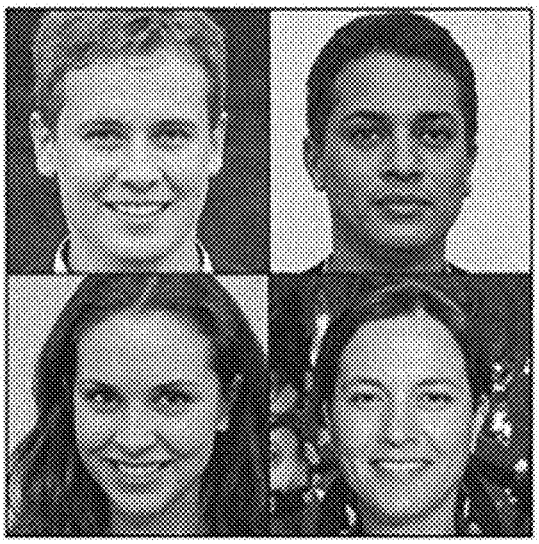

FIG. 2 shows eight random samples generated by a generator trained on the dataset of human faces according to an embodiment of the disclosure.

FIG. 2 shows good generation quality as well as diversity of generated faces.

The problem of generating images with the multi-layer perceptron G that takes a random vector $z \in Z$ and float pixel coordinates $(x,y) \in [-1,1]$ as input and returns the red/green/blue (RGB) value $c \in [0,1]$ of that pixel is considered. To compute the whole output image, the generator G must be evaluated at each pair (x,y) of the coordinate grid. The generation process may be considered as a generative inverse discrete Fourier transform.

The present disclosure is a novel style-based multi-layer perceptron architecture based on positional encoding and weight modulation, that may be used for image generation and provides quality, comparable with modern generative adversarial networks (GANs) in terms of common metrics at the resolution up to 256×256.

The present disclosure demonstrates that this model, while being highly parallelizable, can also be trained to generate images by parts at training time and, therefore, is useful for practitioners with limited graphics processing unit (GPU) resources.

In case of hardware implementation, the target device can be any mobile phone with enough computational resources or any other consumer device that may require such an image synthesis (e.g., a television (TV)). In order to operate properly, such device needs to have a central processing unit (CPU), internal memory storage with images, and random-access memory (RAM). A neural processing unit (NPU) might be also included to speed up computations.

Figure 3:
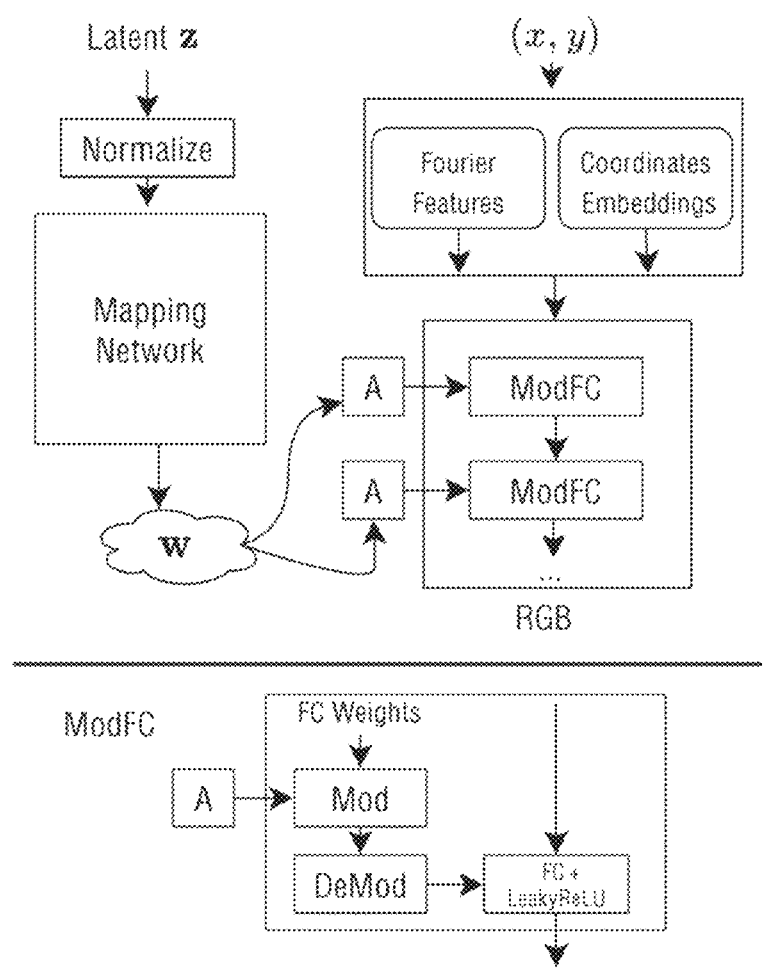
FIG. 3 is a diagram illustrating the CIPS generator architecture according to an embodiment of the disclosure.

An embodiment provides a generator network which synthesizes images of a fixed resolution H×W and has the multi-layer perceptron-type architecture G (see FIG. 3). In more detail, the synthesis of each pixel takes a random vector $z \in Z$ shared across all pixels, as well the pixel coordinates $(x, y) \in \{0 \ldots W-1\} \times \{0 \ldots H-1\}$ as input. It then returns the RGB value $c \in [0,1]^3$ of that pixel G: $(x, y, z) \mapsto c$.

FIG. 3 is a diagram illustrating the Conditionally-Independent Pixel Synthesis (CIPS) generator architecture according to an embodiment of the disclosure. The top part of FIG. 3 shows the generation pipeline, in which the coordinates (x; y) of each pixel are encoded (boxes "Fourier Features" and "Coordinates Embeddings" and processed by a fully-connected (FC) network with weights, modulated with a latent vector w, shared for all pixels (Boxes "ModFC"). The network returns the RGB value of each pixel. The bottom part of FIG. 3 shows the architecture of a modulated fully-connected layer (ModFC).

Latent Z—random vector is being sampled from normal Gaussian distribution with 0 mean and unit variance.

Normalize—scales latent Z so that it's L2 norm would be one (Z/norm(Z)).

Fourier Features—this is a learnable linear layer with sine activation function:

$$e_{f_o}(x,y) = \sin[B_{f_o}(x',y')^T], \quad (2)$$

Coordinate Embeddings—per pixel learnable vector that is being learned for the whole dataset. It can be viewed as some dataset-wide features, in our case it appeared to hold high-frequency components like hairs and eye details.

Mapping network—a fully-convolutional neural network that processes latent vector Z into some learnable distribution before passing it to the main generator.

A—a small neural network (simple linear mapping, different for each layer) processes the output of a mapping network in order to produce a scale vector.

ModFC—a modulation module, that takes an input and scale vector A and does the following (bottom of FIG. 3: The architecture of a modulated fully-connected layer (ModFC)):

Mod+demod—takes an output of A (denoted as s) and an input (denoted as B) and applies the following operation.

$$\hat{B}_{ij} = \frac{s_j B_{ij}}{\sqrt{\epsilon + \sum_{k=1}^{n} (s_k B_{ik})^2}}, \quad \text{Equation 3}$$

FC+LeakyReLU—learnable linear layer followed by the LeakyReLU activation.

Note: default configuration also includes skip connections to the output (not shown here).

Therefore, to compute the whole output image I, the generator G is evaluated at each pair (x; y) of the coordinate grid, while keeping the random part z fixed:

$$I=\{G(x,y;z)|(x,y)\in \text{mgrid}(H,W)\},$$

where $$\text{mgrid}(H,W)=\{(x,y)|0\le x<W, 0\le y<H\} \quad (4)$$

is a set of integer pixel coordinates.

A mapping network M (also a perceptron) turns z into a style vector w∈W, M:z→w, and all stochasticity in the generating process comes from this style component.

Then followed is the StyleGANv2 approach of injecting the style vector w into the process of generation via weight modulation. Any modulated fully-connected (ModFC) layer of the generator (see FIG. 3) can be written in the form $\Psi=\hat{B}\phi+b$, where $\phi\in\mathbb{R}^n$ is an input, $\hat{B}$ is a learnable weight matrix $B\in\mathbb{R}^{m\times n}$ modulated with the style w, $b\in\mathbb{R}^m$ is a learnable bias, and $\Psi\in\mathbb{R}^m$ is an output. The modulation takes place as follows: at first, the style vector w is mapped with a small net (referred to as A in FIG. 3) to a scale vector $s\in\mathbb{R}^n$. Then, the (i; j)-th entry of $\hat{B}$ is computed as $$\hat{B}_{ij} = \frac{s_j B_{ij}}{\sqrt{\epsilon + \sum_{k=1}^{n} (s_k B_{ik})^2}}, \quad \text{Equation 5}$$

where $\epsilon$ is a small constant. After this linear mapping, a LeakyReLU function is applied to $\Psi$.

In an embodiment are skip connections for every two layers from intermediate feature maps to RGB values and sum the contributions of RGB outputs corresponding to different layers. These skip connections add values corresponding to the same pixel, and do not introduce interactions between pixels.

The independence of the pixel generation process, makes the model parallelizable at inference time and, additionally, provides flexibility in the latent space z.

In some modified variants of synthesis, each pixel can be computed with a different noise vector z, though gradual variation in z is needed to achieve consistently looking images.

Positional encoding.

The architecture described above needs an important modification in order to achieve the state-of-the-art synthesis quality. Two slightly different versions of positional encoding for coordinate-based multi-layer perceptrons (MLP), producing images, have been described in literature. Firstly, SIREN proposed a perceptron with a principled weight initialization and sine as an activation function, used throughout all the layers. Secondly, the Fourier features employed a periodic activation function in the very first layer only. In an embodiment applied is a somewhat in-between scheme: the sine function is used to obtain Fourier embedding $e_{f_o}$, while other layers use a standard LeakyReLU function:

$$e_{f_o}(x,y)=\sin[B_{f_o}(x',y')^T], \quad (6)$$

where $$x' = \frac{2x}{W-1} - 1 \text{ and } y' = \frac{2y}{H-1} - 1$$

are pixel coordinates, uniformly mapped to the range [−1; 1] and the weight matrix $B_{f_o}\in\mathbb{R}^{2\times n}$ is learnable, as in SIREN.

However, only Fourier positional encoding usage was insufficient to produce plausible images. In particular, it has been determined that the outputs of the synthesis tend to have multiple wave-like artifacts. Therefore, a separate vector $e_{co}^{(x,y)}$ is trained for each spatial position and call them coordinate embeddings. They represent H×W learnable vectors in total. For comparison of these two embedding from the spectral point of view. The full positional encoding e (x; y) is a concatenation of Fourier features and a coordinate embedding $$e(x,y)=\text{concat}[e_{f_o}(x,y), e_{co}^{(x,y)}] \quad (7)$$

and serves as an input for the next perceptron layer:

$$G(x,y;z)=G'(e(x,y);M(z)). \quad (8)$$

Architecture details.

Both Fourier features and coordinate embeddings experimentally had the dimension of 512. The generator had 14 modulated fully-connected layers of width 512. Leaky ReLU activation with the slope 0,2 was used. Experiments were implemented on top of the public code for Style-GANv2. An embodiment model was trained with a standard non-saturating logistic GAN loss with R1 penalty applied to the discriminator D. The discriminator has a residual architecture which has been deliberately kept intact. Networks were trained by Adam optimizer with a learning rate 2×10⁻³ and hyperparameters:

$$\beta_0=0, \beta_1=0.99, \epsilon=10^{-8}. \quad (9)$$

Evaluation.

Figure 1:
FIG. 1 illustrates samples from proposed generators trained on several challenging datasets (LSUN Churches, Flickr Faces-HQ (FFHQ), Landscapes, Satellite-Buildings, Satellite-Landscapes) at resolution 256×256 according to the related art.

CIPS generators and their variations are evaluated on a range of datasets. For the sake of efficiency, most evaluations are restricted to 256×256 resolution. The following datasets were considered (see FIG. 1):

The Flickr Faces-HQ (FFHQ) dataset contains 70,000 high quality well-aligned, mostly near frontal human faces. This dataset is the most regular in terms of geometric alignment and the StyleGAN variants are known to perform very well in this setting.

The LSUN Churches dataset contains 126,000 outdoor photographs of churches of rather diverse architectural style. The dataset is regular, yet images all share upright orientation.

The Landscapes dataset contains 60,000 manually collected landscape photos from the Flickr website.

The Satellite-Buildings dataset contains 280,741 images of 300×300 pixels (cropped to 256×256 resolution and randomly rotated). This dataset has large size, and is approximately aligned in terms of scale, yet lacks consistent orientation.

Finally, the Satellite-Landscapes dataset contains a smaller curated collection of 2,608 images of 512×512 resolution of satellite images depicting various impressive landscapes found on Google Earth (cropped to 256×256 resolution). This is the most "textural" dataset, and lacks consistent scale or orientation.

For evaluation, commonly used metrics for image generation such as Frechet Inception Distance (FID) are used, as well as more recently introduced generative Precision and Recall measures.

Main evaluation is thus against the state-of-the-art StyleGANv2 generator. In the present disclosure implementation of StyleGANv2 is trained on all four datasets. Trained is StyleGANv2 without style mixing and path regularization of generator; these changes do not influence the FID metric. The results of this key comparison are presented in Tables 1 and 2. Neither of the two variants of the generator dominates, with StyleGANv2 achieving a lower (better) FID score on FFHQ, Landscapes, and (marginally) Satellite-Buildings datasets, while the CIPS generator achieves a lower score on the LSUN Churches and Satellite-Landscapes datasets.

TABLE 1

|  | StyleGANv2 | CIPS (ours) |
|---|---|---|
| FFHQ | 4.05 | 4.48 |
| LSUN Churches | 3.86 | 3.58 |
| Landscapes | 2.81 | 3.61 |
| Satellite-Buildings | 76.33 | 76.58 |
| Satellite-Landscapes | 51.54 | 48.47 |

Table 1: FID on multiple datasets at resolution of 256×256 for CIPS-skips model. Note that CIPS is of comparable quality with state-of-the-art StyleGANv2, and better on Churches. The value for CIPS model on FFHQ differs from the one reported in Tab. 3 as authors trained this model for more time and with larger batch size.

TABLE 2

| Model | Precision | Recall |
|---|---|---|
| StyleGANv2 | 0.609 | 0.513 |
| CIPS | 0.613 | 0.493 |

Table 2: Precision & Recall measured on FFHQ at 256×256.

The resulting quality is better in terms of precision (corresponds to plausibility of images) and worse in recall (this points to the greater number of dropped modes).

Ablations.

The importance of different parts of the model is evaluated by its ablation on the FFHQ dataset (Table 3). Thus, removing Fourier features, coordinate embeddings (configuration referred to as CIPS-NE) and replacing LeakyReLU activation with sine function in all layers are considered. Also compared are the variants with residual connections (Style-GANv2 implementation adjusting variance of residual blocks with the division by $\sqrt{2}$) with the main choice of cumulative projections to RGB. Additionally, the "base" configuration without skip connections and residual connections is considered. In this comparison, all models were trained for 300K iterations with batch size of 16.

Figure 4:
FIG. 4 illustrates image corresponding to the mean style vector in the space of for CIPS (left) and CIPS-NE (no embeddings) generators (right) according to an embodiment of the disclosure.

As the results show, coordinate embeddings, residual blocks and cumulative projection to RGB significantly improve the quality of the model. The removal of coordinate embeddings most severely worsens the FID value, and affects the quality of generated images (e.g., as shown in FIG. 4 on the right). The importance of coordinate embeddings for the CIPS model is investigated below.

FIG. 4 illustrates an image corresponding to the mean style vector in the space of W for CIPS (left) and CIPS-NE (no embeddings) generators (right) according to an embodiment of the disclosure. The left image in FIG. 4 has more plausible details such as hair, which confirms the results in Table 3.

TABLE 3

| CIPS | "base" | "No embed (NE)" | "No Fourier" | Main | "Residual" | Sine |
|---|---|---|---|---|---|---|
| Fourier Featuress | + | + | − | + | + | − |
| Coordinate Embeddings | + | − | + | + | + | + |
| Residual blocks | − | − | − | − | + | − |
| Skip connections | − | − | − | + | − | − |
| Sine Activation | − | − | − | − | − | + |
| FID | 6.71 | 12.71 | 10.18 | 6.31 | 6.52 | 10.0 |

Table 3: Effects of the modifications of the CIPS generator on the FFHQ dataset in terms of FID score. Each column corresponds to a certain configuration, while rows correspond to present/missing features. The simultaneous usage of Fourier features and coordinate embeddings is necessary for a good FID score. Also, both residual connections and cumulative skip connections (default configuration) to the output outperform the plain multilayer perceptron.

Influence of positional encodings.

To analyze the difference between Fourier features $e_{f_o}$ and coordinate embeddings $e_{co}$, the spectrum of these codes was plotted for the generator CIPS-base, trained on FFHQ.

Figure 5A:
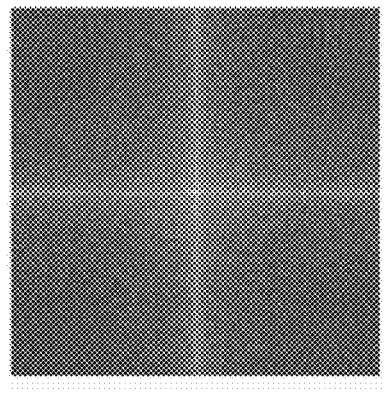
FIGS. 5A and 5B illustrate the spectrum magnitude for our two kinds of positional encoding (color scale is equal for both plots), (5A) Fourier features, (5B) Coordinate embeddings according to various embodiments of the disclosure.
Figure 5B:
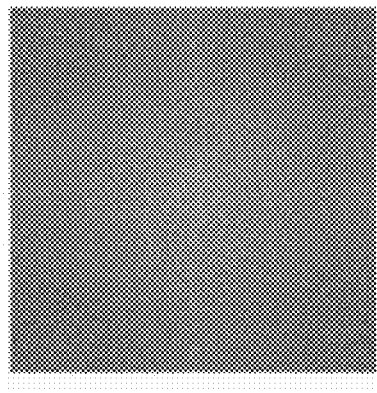

Referring to FIGS. 5A and 5B, Fourier encoding generally carries lowfrequency components, whereas coordinate embeddings resemble more high-frequency details.

FIGS. 5A and 5B illustrate the spectrum magnitude for our two kinds of positional encoding (color scale is equal for both plots) according to various embodiments of the disclosure. The output of coordinate embeddings clearly has more higher frequencies. FIGS. 5A and 5B shows that the coordinate embedding has more high-frequency component and Fourier features focuses on low-resolution components.

Figure 6A:
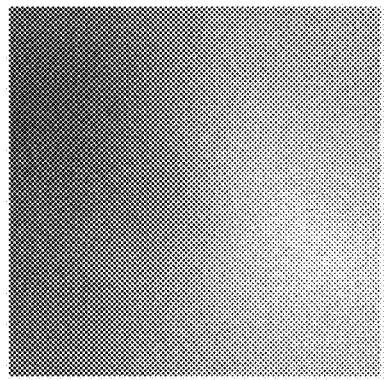
FIGS. 6A and 6B illustrate principal component analysis (PCA) plot (3 components) for two kinds of positional encoding of CIPS-base, (6A) Fourier features, (6B) Coordinate embeddings according to various embodiments of the disclosure.
Figure 6B:
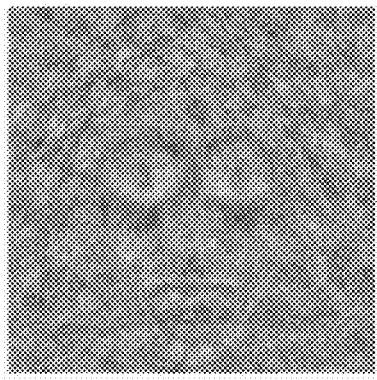

The Principal Component Analysis (PCA) of the two encodings supports the same conclusion (FIGS. 6A and 6B).

FIGS. 6A and 6B illustrate PCA plot (3 components) for two kinds of positional encoding of CIPS-base (Fourier features and coordinate embeddings) according to various embodiments of the disclosure. The images have been obtained by applying a principal component analysis (PCA) method of dimensionality reduction to the channel dimension in order to produce a matrix of shape Height*Width*3. These 3 channels can be interpreted as RGB colors for illustrational purposes.

Referring to FIG. 6A, that PCA plot is not actually tractable since the embeddings has been taken from the model trained on the landscape dataset which does not have repeated patterns, and FIG. 6B embeddings have been taken from the generator trained on well-aligned faces and eyes, lips, nose, eyebrows, etc., are clearly visible. Coordinate embeddings contain not only more fine-grained details, but also key points of the averaged face. An explanation is simple: coordinate embeddings are trained independently for each pixel, while is a learned function of the coordinates. However, the next layers of the network could transform the positional codes and, for example, finally produce more fine-grained details, relying on Fourier features.

Figure 7A:
FIGS. 7A, 7B, and 7C illustrate influence of different types of positional encoding on the resulting image according to various embodiments of the disclosure. Left (7A): original image. Center (7B): coordinate embeddings zeroed out. Right (7C): Fourier features zeroed out.
Figure 7B:
Figure 7C:
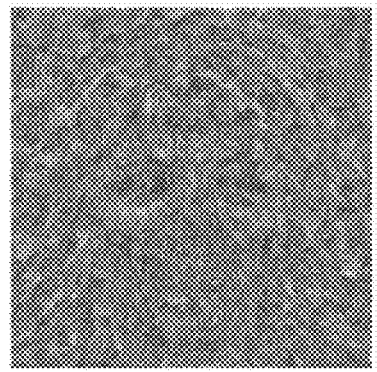

FIGS. 7A, 7B, and 7C illustrate influence of different types of positional encoding according to various embodiments of the disclosure.

To demonstrate that this is not the case, the following experiment has been conducted. Zeroed out is either the output of Fourier features FIG. 7A or coordinate embeddings FIG. 7B and showed the obtained images in FIGS. 7A, 7B, and 7C. One can notice that the information about the facial hair's details as well as the forelock is located in the coordinate embeddings. This proves that it is the coordinate embeddings FIG. 7B that are the key to high frequency details of the resulting image. Left FIG. 7A: original image. Center FIG. 7B: coordinate embeddings zeroed out (the image contains no finegrained details). Right FIG. 7C: Fourier features zeroed out (only high-frequency details are present).

Spectral analysis of generated images.

The common convolutional upsampling operations can lead to the inability to learn the spectral distribution of real images, in spite of any generator architecture. In contrast, CIPS operates explicitly with the coordinate grid and has no upscaling modules, which should to improved reproduction of the spectrum. Indeed, the spectrum of the present models (CIPS-"base" without residual and skip connections; CIPS-NE) are compared to Style-GANv2 and demonstrate that CIPS generators design provides advantages in the spectral domain.

Figure 8A:
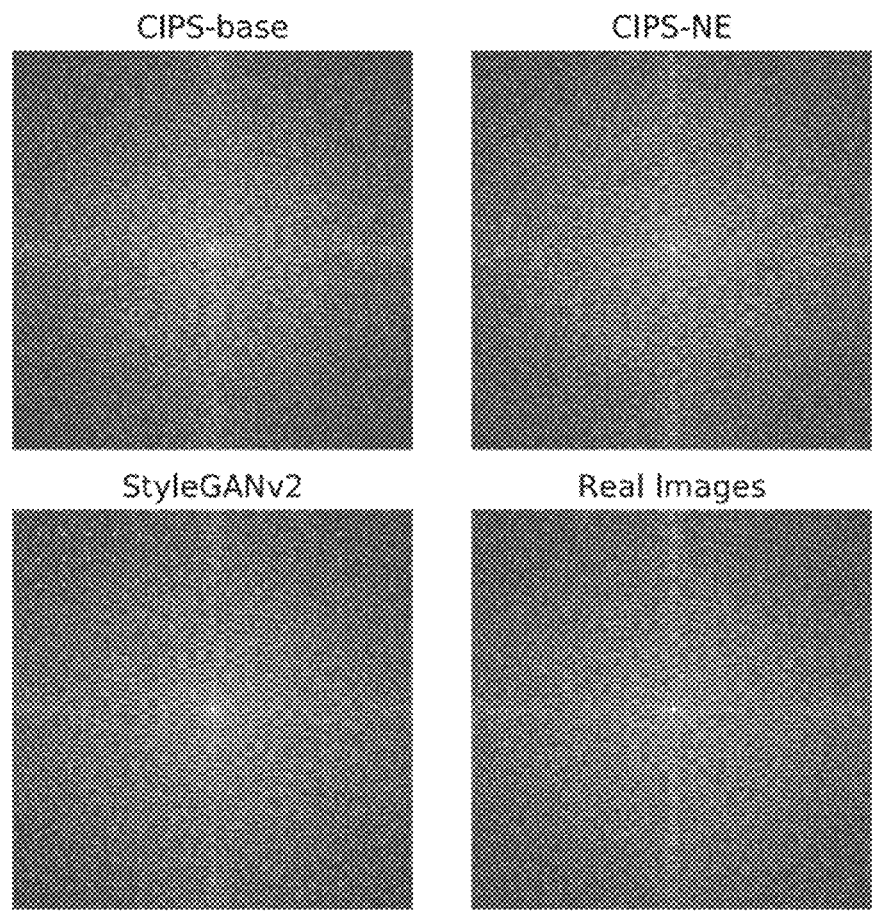
FIG. 8A illustrates magnitude spectrums according to an embodiment of the disclosure. Proposed models produce less artifacts in high frequency components (note the grid-like pattern in StyleGANv2)
Figure 8B:
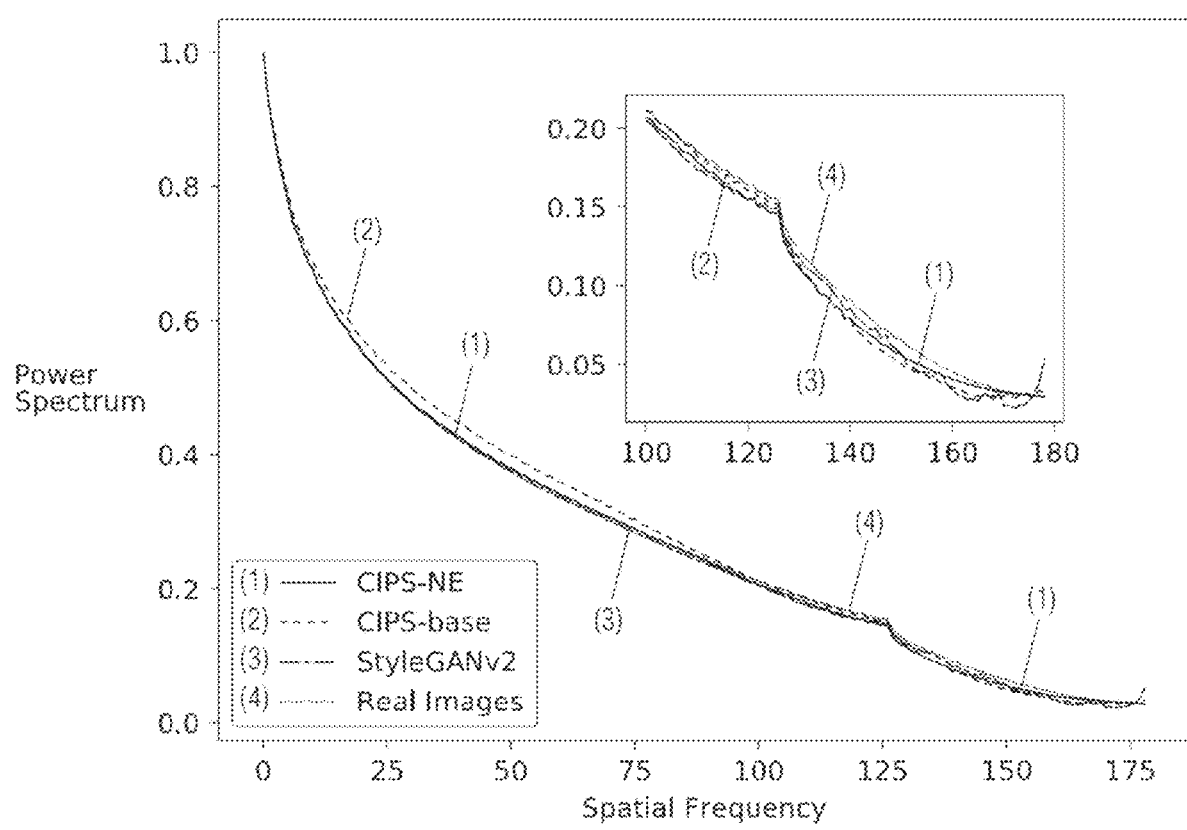
FIG. 8B is a diagram illustrating azimuthal integration over Fourier power spectrum according to an embodiment of the disclosure.

FIGS. 8A and 8B illustrate a spectral analysis for models trained on FFHQ at resolution of 256×256 according to various embodiments of the disclosure. Results were averaged across 5000 samples. CIPS-NE is demonstrated to be most similar to real images.

FIG. 8A illustrates magnitude spectrums. The models CIPS-NE and CIPS-base produce less artifacts in high frequency components. The spectrum of StyleGANv2 has artifacts in high-frequency regions (the grid-like pattern in StyleGANv2, which appears as light dots in the edges of the spectrum), not present in the CIPS generators.

The azimuthal integration is also used over the Fourier power spectrum, FIG. 8B illustrates azimuthal integration over the Fourier power spectrum. The curve of StyleGANv2 has heavy distortions in most high frequency components. CIPS-NE demonstrates a more realistic and smooth tail than CIPS-base, while being worse in terms of FID. It is worth noting that azimuthal integration statistics of CIPS-NE are very close to those of real images. However, adding the coordinate embeddings degrades a realistic spectrum while improving the quality in terms of FID (Table 3). The introduction of skip connections makes the spectra less similar to those of natural images.

Interpolation.

The experimental part concludes with the demonstration of the flexibility of CIPS. As well as many other generators, CIPS generators have the ability to interpolate between latent vectors with meaningful morphing.

Figure 11:
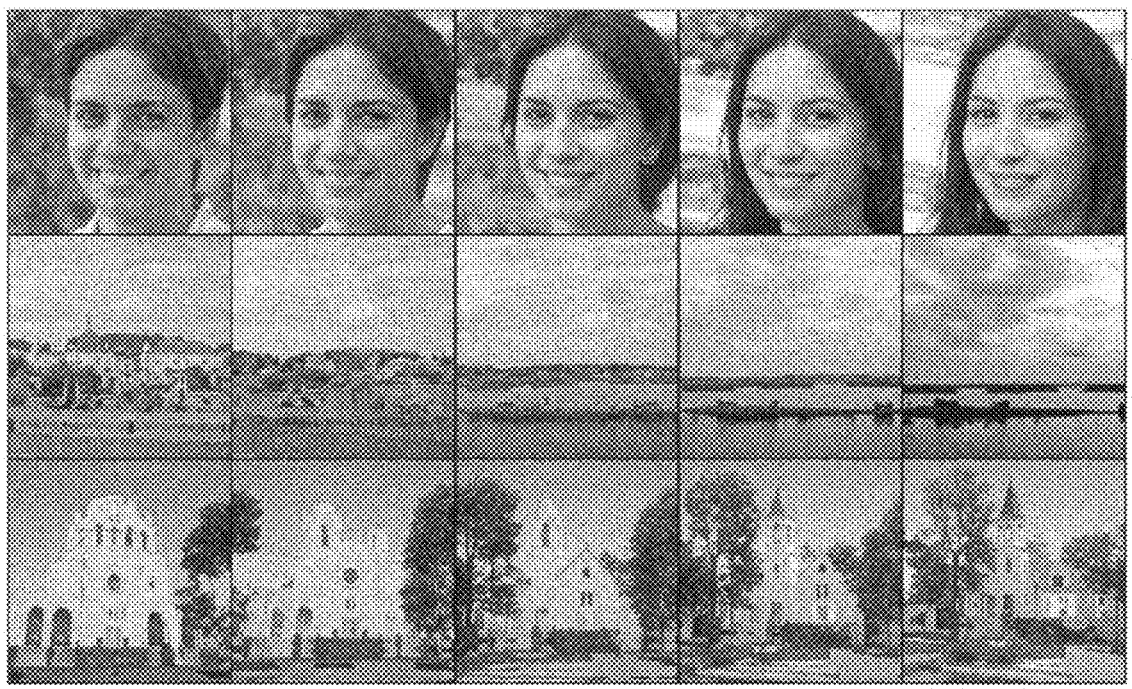
FIG. 11 illustrates latent linear morphing between two sampled images—the left-most and right-most ones according to an embodiment of the disclosure.

FIG. 11 illustrates latent linear morphing between two sampled images—i.e., the left-most and right-most ones according to an embodiment of the disclosure.

As expected, the change between the extreme images occurs smoothly and allows for the use of this property, in a similar vein as in the original works.

Foveated rendering and interpolation.

One of the inspiring applications of the per-pixel generator is the foveated synthesis. The foveated synthesis ability can be beneficial for computer graphics and other applications, as well as mimics human visual system. In foveated synthesis, an irregular grid of coordinates is sampled first, denser in the area where a gaze is assumed to be directed to, and sparser outside of that area. After that, CIPS is evaluated on this grid (size is less than the full resolution), and color for missing pixels of the image is filled using interpolation.

Figure 9:
FIG. 9 illustrates images generated using foveated synthesis according to an embodiment of the disclosure.

FIG. 9 illustrates images generated using foveated synthesis according to an embodiment of the disclosure.

Referring to FIG. 9, in each case, the CIPS generator was sampled on a 2D Gaussian distribution concentrated in the center of an image (standard deviation=0:4*image size). Left to right: sampled pattern covers 5% of all pixels, 25%, 50%, and 100% (full coordinate grid). Missing color values have been filled via bicubic interpolation.

Alongside the foveated rendering, it is also possible to interpolate the image beyond the training resolution by simply sampling denser grids. Here, a model, trained on images of 256×256 resolution to process a grid of 1024× 1024 pixels is used and compared with upsampling the results of upsampling the image synthesized at the 256×256 resolution with a Lanczos filter. As FIGS. 10A and 10B suggests, more plausible details are obtained with denser synthesis than with the Lanczos filter.

Figures 10A, 10B:
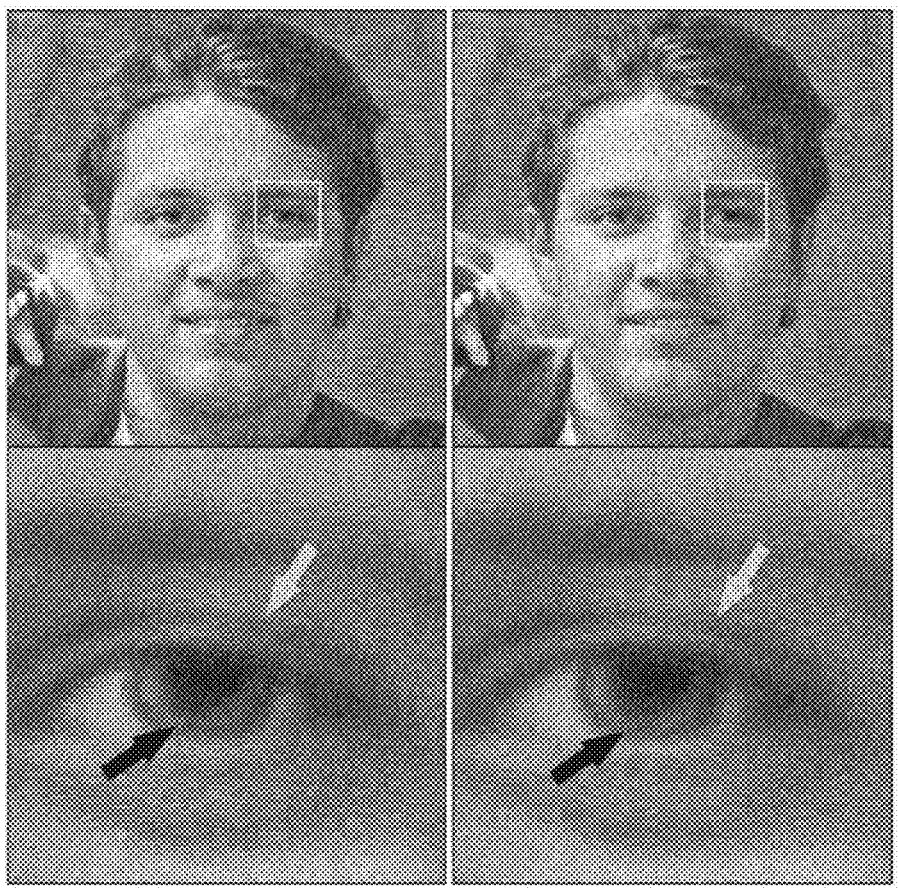
FIGS. 10A and 10B: Left (FIG. 10A) illustrates the generated image of resolution 256×256, upscaled with a Lanczos upsampling (or resampling) scheme [15]. Right (FIG. 10B) illustrates the image, synthesized by CIPS according to various embodiments of the disclosure.

FIGS. 10A and 10B: Left (FIG. 10A) illustrates the generated image of resolution 256×256, upscaled with the Lanczos upsampling scheme to 1024×1024. Right (FIG. 10B) illustrates the image, synthesized by CIPS, trained at resolution of 256×256 on the coordinate grid of resolution 1024×1024 according to various embodiments of the disclosure. Note the sharpness/plausibility of the eyelid and the more proper shape of the pupil when using the embodiment.

Referring to FIGS. 10A and 10B, when the embodiment is used (FIG. 10B), the image on the right is sharper, the shape of the pupil is closer to the circle, the fold above the eye has a more even shape, while in the left image (FIG. 10A) the pupil climbs onto the iris, and the fold above the eye is blurred.

Panorama synthesis.

As CIPS is built upon a coordinate grid, it can relatively easily use non-Cartesian grids. To show this, a cylindrical system is adopted to produce landscape panoramas. The training setup is as follows: a crop 256×256 is uniformly sampled from the cylindrical coordinate grid and trains the generator to produce images using these coordinate crops as inputs. In the disclosure during training real panoramas are not used, in contrast to other coordinate-based COCOGAN model.

FIGS. 12A and 12B provide examples of panorama samples obtained with the resulting model according to an embodiment of the disclosure.

As each pixel is generated from its coordinates and style vector only, the architecture admits pixel-wise style interpolation (FIG. 12C). In these examples, the style vector blends between the central part (the style of FIG. 12A) and the outer part (the style of FIG. 12B)). Two upper images are linearly blended from the CIPS generator trained on the Landscapes dataset with a cylindrical coordinate system. The resulting image contains elements from both original panoramas: buildings and water integrated naturally. When synthesizing a panorama cylindric coordinates are used instead, and this allows to synthesize rectangular images. The rest of the method is the same.

Typical artifacts.

Typical artifacts that recur in the results of CIPS generators are provided.

Figure 13:
FIG. 13 illustrates examples of the most common kinds of artifacts on different datasets according to an embodiment of the disclosure.

FIG. 13 illustrates examples of the most common kinds of artifacts on different datasets according to an embodiment of the disclosure.

Referring to FIG. 13, the artifacts are best described as wavy textures on hair, background, and glowing blobs. The wavy texture (in hair) and repeated lines pattern (in buildings) are attributed to the periodic nature of the sine activation function within the Fourier features. CIPS may produce a realistic image with a small part of the image being inconsistent with the rest and out of the domain. This behavior may be caused by the LeakyReLU activation function that divides the coordinate grid into parts. For each part, CIPS effectively applies its own inverse discrete Fourier transform. As CIPS generators do not use any upsampling or other pixel coordination, it is harder for the generator to safeguard against such behavior.

Conclusion.

A new generator model called CIPS is provided, a high-quality architecture with conditionally independent pixel synthesis, such that the color value is computed using only random noise and coordinate position.

The architecture has the ability, without spatial convolutions, attention or upsampling operations, to obtain decent quality in terms of FID and precision and recall; such results have not been known earlier for perceptron-based models. Furthermore, in the spectral domain, outputs of CIPS are harder to discriminate from real images. CIPS-NE modification may be weaker in terms of plausibility, yet has a more realistic spectrum.

Direct usage of a coordinate grid allows work with more complex structures, such as cylindrical panoramas, by replacing the underlying coordinate system.

In summary, the generator demonstrates quality on par with the state-of-the-art model StyleGANv2; moreover, it has applications in various diverse scenarios. The model may be successfully applied to foveated rendering and super-resolution problems in their generative interpretations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating images of a fixed resolution H×W with conditionally-independent pixel synthesis, the method comprising:
taking, by a multi-layer perceptron G, a random vector $z \in Z$ and float pixel coordinates $(x,y) \in \{0 \ldots W-1\} \times \{0 \ldots H-1\}$ as input;
processing the float pixel coordinates with a set of syntheses with different frequencies to get coordinate coding, acceptable by a network;
providing, by using the float pixel coordinates, a lookup for pretrained coordinate embedding in network weights using the float pixel coordinates;
transforming with a mapping network the random vector, wherein an output of the network affects the weights in a fully-connected layer (ModFC);
returning, by multi-layer perceptron, a red/green/blue (RGB) value of each pixel;
evaluating the generator of perceptron G(x;y;z) at each pair(x,y) of a coordinate grid while keeping a random part z fixed; and
computing a whole output image according to:

$I = \{G(x,y;z) | (x,y) \in \text{mgrid}(H,W)\}$, where $\text{mgrid}(H,W) = \{(x,y) | 0 \leq x < W, 0 \leq y < H\}$ is a set of integer pixel coordinates.

2. The method of claim 1, wherein the mapping network and perceptron transform z into a style vector and all stochasticity in a generating process is from the style vector.

3. The method of claim 1, wherein generated images are images of an arbitrary resolution.

4. The method of claim 1, wherein generated images are environment maps or cylindrical panoramas.

5. The method of claim 1, wherein the float pixel coordinates are cylindric coordinates for synthesize rectangular images.

6. The method of claim 1, wherein the float pixel coordinates are a sampling irregular grid of coordinates, which is denser in an area where a gaze is directed to, and is sparser outside of the area.

* * * * *